(12) United States Patent
Coleman

(10) Patent No.: US 8,620,146 B1
(45) Date of Patent: Dec. 31, 2013

(54) PICTURE-IN-PICTURE VIDEO SYSTEM FOR VIRTUAL EXERCISE, INSTRUCTION AND ENTERTAINMENT

(76) Inventor: Theresa Coleman, Gilford, NH (US)

( * ) Notice: Subject to any disclaimer, the term of this patent is extended or adjusted under 35 U.S.C. 154(b) by 12 days.

(21) Appl. No.: 13/339,801

(22) Filed: Dec. 29, 2011

Related U.S. Application Data

(63) Continuation-in-part of application No. 12/057,712, filed on Mar. 28, 2008, now abandoned.

(51) Int. Cl.
*G11B 27/00* (2006.01)
*H04N 5/93* (2006.01)
*H04N 5/77* (2006.01)
*H04N 5/775* (2006.01)
*H04N 5/765* (2006.01)
*H04N 9/80* (2006.01)

(52) U.S. Cl.
USPC ........... 386/278; 386/223; 386/224; 386/230; 386/234; 386/239

(58) Field of Classification Search
USPC .................................. 386/200–234, 278–290
See application file for complete search history.

(56) References Cited

U.S. PATENT DOCUMENTS

| | | |
|---|---|---|
| 4,631,676 A | 12/1986 | Pugh |
| 4,751,642 A | 6/1988 | Silva et al. |
| 4,925,189 A | 5/1990 | Braeunig |
| 4,988,981 A | 1/1991 | Zimmerman et al. |
| 5,076,584 A | 12/1991 | Openiano |
| 5,362,069 A | 11/1994 | Hall-Tipping |
| 5,442,168 A | 8/1995 | Gurner et al. |
| 5,562,572 A | 10/1996 | Carmein |
| 5,577,981 A | 11/1996 | Jarvik |
| 5,591,104 A | 1/1997 | Andrus |
| 5,913,727 A | 6/1999 | Ahdoot |
| 6,102,832 A | 8/2000 | Tani |
| 6,159,016 A * | 12/2000 | Lubell et al. .................. 434/247 |
| 6,336,891 B1 | 1/2002 | Fedrigon |
| 6,468,086 B1 | 10/2002 | Brady-Koontz |
| 7,074,162 B2 | 7/2006 | Kuo |
| 2002/0064764 A1* | 5/2002 | Fishman et al. .............. 434/252 |
| 2002/0120925 A1* | 8/2002 | Logan ................ 725/9 |
| 2002/0181752 A1 | 12/2002 | Wallo et al. |
| 2003/0223736 A1* | 12/2003 | Muzaffer et al. ............. 386/125 |
| 2007/0171921 A1* | 7/2007 | Wookey et al. ............... 370/401 |
| 2009/0268079 A1* | 10/2009 | Motomura et al. .......... 348/347 |

FOREIGN PATENT DOCUMENTS

| | | |
|---|---|---|
| JP | 6165847 | 6/1994 |
| JP | 10263126 | 10/1998 |
| JP | 2007097927 | 4/2007 |
| WO | WO97/05926 | 2/1997 |

\* cited by examiner

*Primary Examiner* — Hung Dang
(74) *Attorney, Agent, or Firm* — Lambert & Associates; Gary E. Lambert; David J. Connaughton, Jr.

(57) ABSTRACT

A method and apparatus for providing a picture-in-picture overlay video system for superimposing real time video onto a prerecorded video image onto a viewing screen. The present invention is used for exercise and sports instruction by enabling the user to view a real time video image superimposed on a viewing screen showing a prerecorded instructional video and allowing for comparison of the users form in comparison to that of the instructor on the prerecorded video. The merged images can also be saved for future evaluation.

13 Claims, 18 Drawing Sheets

PICTURE-IN-PICTURE VIDEO SYSTEM FOR VIRTUAL EXERCISE, INSTRUCTION AND ENTERTAINMENT

RELATED APPLICATIONS

This application is a Continuation-In-Part of U.S. patent application Ser. No. 12/057,712, having a filing date 28 Mar. 2008 now abandoned.

Please incorporate by reference all information in said patent application into this continuation-in-part application.

BACKGROUND OF THE INVENTION

1. Field of the Invention

The present invention relates generally to video systems and, more specifically, to a method and apparatus for inserting a real time user generated video compilation into an original video presentation, such as instructional videos, entertainment videos, music videos, performing arts videos and derivative works videos.

The video system of the present invention provides means for the user to insert their image into a preexisting video presentation available or contained on a medium, such as, DVD, CD and the Internet for educational, instructional or entertainment purposes.

The system utilizes a USB camera in communication with a play station 2, DVD player, lap top, desk top computer or other such device that plays and/or records video. The recorded video is then viewable on any television or video screen. When utilized as an instruction video, the USB camera records the user's image and projects that image onto the viewing screen next to the instructor allowing the user to exercise/practice with the instructor's guidance. Upon completion of the recording sequence, the user can playback the merged video to analyze the session and critique for improvements.

The video system of the present invention's main objective is to obtain virtual exercise, instructional dance and/or instruction for sports. Additionally, the video system can be used for entertainment purposes such as superimposing oneself into a movie, music video or any other video of choice.

To suit individual videos, the video system of the present invention provides means for the user to size and position the area of the live overlay. For example, if the instructor on the video is centralized on the viewing screen, the user can insert the live image to the left or right of the instructor such that the image of the instructor is not impeded.

2. Description of the Prior Art

There are other virtual physical fitness, exercise and gaming systems. Typical of these is U.S. Pat. No. 4,631,676 issued to Pugh on Dec. 23, 1986.

Another patent was issued to Silva on Jun. 14, 1988 as U.S. Pat. No. 4,751,642. Yet another U.S. Pat. No. 4,925,189 was issued to Braeunig on May 15, 1990 and still yet another was issued on Jan. 29, 1991 to Zimmerman as U.S. Pat. No. 4,988,981.

Another patent was issued to Openiano on Dec. 31, 1991 as U.S. Pat. No. 5,076,584. Yet another U.S. Pat. No. 5,362,069 was issued to Hall-Tripping on Nov. 8, 1994. Another was issued to Gurner on Aug. 15, 1995 as U.S. Pat. No. 5,442,168 and still yet another was issued on Oct. 8, 1996 to Carmein as U.S. Pat. No. 5,562,572.

Another patent was issued to Jarvik on Nov. 26, 1996 as U.S. Pat. No. 5,577,981. Yet another U.S. Pat. No. 5,591,104 was issued to Andrus on Jan. 7, 1997. Another was issued to Ahdoot on Jun. 22, 1999 as U.S. Pat. No. 5,913,727 and still yet another was issued on Aug. 15, 2000 to Tani as U.S. Pat. No. 6,102,832.

Another patent was issued to Fedrigon on Jan. 8, 2002 as U.S. Pat. No. 6,336,891. Yet another U.S. Pat. No. 6,468,986 was issued to Brady-Koontz on Oct. 22, 2002. Another was issued to Kuo on Jul. 11, 2006 as U.S. Pat. No. 7,074,162.

Internationally, a patent application was issued to Tsuyoshi on Apr. 19, 2007 as Japanese Patent Application No. JP2007/097927. Yet another Japanese Patent No. JP10263126 was issued to Norio on Oct. 6, 1998. Another was issued to Katsumi on Jun. 14, 1994 as Japanese Patent No. JP6165847. A World Publication was issued to Jarvik on Feb. 20, 1997 as WO9705926.

U.S. Pat. No. 4,631,676

Inventor: Pugh

Issued: Dec. 23, 1986

A reflective marker is attached to the front and side of each joint of a subject whose motion or gait is to be analyzed. Each marker is formed of reflective tape and is relatively small and weightless and will not hinder or affect the subject's movements. A pair of Sony Video Motion Analyzers operating at sixty frames per second are positioned to the front and side of a walkpath having a marked centerline along which the subject walks; and coact with video cassette tape recorders to record the subject's movements along the runway. Monitors, provided for playback of the recorded video tape, are each provided with a built-in magnetic disk allowing ten seconds of high-speed motion to be recorded and displayed. A CAT-100 video analysis board, retrofitted into a Z 80 64K TE1 minicomputer, digitizes each recorded video frame to locate by x, y, (or z) coordinates the centroid of each marker and feeds the data into a PDP 11/70 computer which operates on the data to provide line and stick figure outputs of the data and which depict the motions under study; cyclograms of hip angle-knee angle relationships for a cycle of movement of the subject are also provided.

U.S. Pat. No. 4,751,642

Inventor: Silva

Issued: Jun. 14, 1988

Interactive sports simulation system for providing an actual physical trial of the sports performance to be enacted. The system includes audiovisual means for simulating an actual competitive sports environment, sensors for measuring the sports performance and physiological performance of an athlete being tested, and computer means responsive to the performance data from the sensors for controlling the simulated sports environment created by the audiovisual means. The system facilitates psychological conditioning of the athlete through psychophysiological manipulation of the environment by the athlete.

U.S. Pat. No. 4,925,189

Inventor: Graeunig

Issued: May 15, 1990

A video game controller which attaches to the user's upper body allowing the user to play a video game by leaning the upper body in any direction, simulating the movement of a joystick. The controller attaches to the user's upper back with an arrangement of straps and buckles. The tilt of the user's upper body is detected by an array of mercury switches with the resultant electrical signals being transmitted to the input of a video game. The specific angle of tilt required to actuate the mercury switches can be adjustable, thereby varying the degree of upper body movement needed to play a particular video game. Additional controls for the video game, such as a firing control, are provided by a hand held pushbutton attached to the controller via a flexible cord. Playing a video game using this arrangement results in vigorous exercise of the abdominal, back and lateral muscles.

U.S. Pat. No. 4,988,981

Inventor: Zimmerman

Issued: Jan. 29, 1991

Apparatus is disclosed for generating control signals for the manipulation of virtual objects in a computer system according to the gestures and positions of an operator's hand or other body part. The apparatus includes a glove worn on the hand which includes sensors for detecting the gestures of the hand, as well as hand position sensing means coupled to the glove and to the computer system for detecting the position of the hand with respect to the system. The computer system includes circuitry connected to receive the gesture signals and the hand position signals for generating control signals in response thereto. Typically, the control signals are used to manipulate a graphical representation of the operator's hand which is displayed on a monitor coupled to the computer system, and the graphical representations of the operator's hand manipulates virtual objects or tools also displayed by the computer.

U.S. Pat. No. 5,076,584

Inventor: Openiano

Issued: Dec. 31, 1991

A controller electrically interfaced to a video game computer or the like for the purpose of controlling a progression of the video game or the like is selectively actuated by discrete motions and forces the locations, magnitudes, and orientations of which are variably predetermined by the user. Pressure, or proximity, sensor units, normally four in number, are independently placeable upon any surface, and normally upon a floor, in any desired pattern and over any desired area. An optional multi-channel hand-held remote control transmitter is affixed with a variable weight. The signals produced by the arbitrarily located pressure or proximity sensors, and by the optional hand-held transmitter, are received by a video game control unit and used to produce electrical signals suitable to be received by a conventional video game computer or the like for the purpose of controlling the progression of the video game. The individual sensor units may be adjusted for the magnitude of forces that must be applied thereto for purposes of actuation. Because the spatial arrangements of the various sensors, and the selection of the forces to be applied thereto, are completely arbitrary, the user is in complete control of the nature and location and magnitude of those motions and forces that he or she must provide, at a preselected degree of difficulty, to the game controller in order to sequence the video game.

U.S. Pat. No. 5,362,069

Inventor: Hall-Tipping

Issued: Nov. 8, 1994

A person simultaneously plays a video game and operates an exercise device, such as an exercise bicycle. A first sensor generates an output level signal indicative of the output level (e.g., pedal speed) of the exercise device. A second sensor generates an aerobic activity level (e.g., heart rate) signal indicative of the aerobic activity level of the exerciser. The output level signal affects the play of the video game. If the aerobic activity level signal is too low, the exercise device is made more difficult to operate and the play of the video game is altered to encourage the exercise to increase the output level of the exercise device. The play of the video game is also affected by signals generated by joystick controls operated by the exerciser's hands.

U.S. Pat. No. 5,442,168

Inventor: Gurner

Issued: Aug. 15, 1995

An optical controller is capable of surrounding a player with a radiation screen from a plurality of panels, and enables the player to produce control signals for interface with a controlled instrument such as a musical instrument, a video game processor, etc. The insertion of the appendage of the player can produce a functional control signal. The relative position of the insertion of the appendage can be determined, for example, as a result of the intensity of reflected radiation in the dispersing radiation screen. The video game processing unit can play either a conventional video game that usually accepts eight functional control signals, or it can utilize the full capacities of the control signals available from the optical controller. The player can simulate the movements of the video character to experience a more realistic game play action.

U.S. Pat. No. 5,562,572

Inventor: Carmein

Issued: Oct. 8, 1996

A treadmill having a track assembly that allows a user to walk or run in any arbitrary direction. A movable user support has a plurality of rotatable members that rotate about axes normal to the direction of movement of the user support. Separate power driven mechanisms concurrently move the user support and rotate the members to omni-directional user movement. A control for the power driven mechanisms is responsive to the directional orientation of the user on the user support to cause the user support to operate in the direction of the orientation of the user.

U.S. Pat. No. 5,577,981

Inventor: Jarvick

Issued: Nov. 26, 1996

This invention relates to computer controlled exercise machines and provides the user with a wide variety of interactive exercise options controlled by software. A virtual reality hybrid of virtual and real environments is provided which permits the user to perform significant physical exertion by applying forces to the machine while viewing images on a head mounted display. The invention permits the user to view his own hands and body superimposed over a computer generated image of objects that are not actually present while maintaining parts of the exercise machine that the user physically contacts, such as a handle, superimposed over the computer generated image. As the user exerts forces against the machine (such as the handle) he perceives that he is exerting forces against the objects the images represent. The invention includes a video camera and computer adapted to record images from the real world which may be combined with computer generated images while retaining the proper spacial orientation to produce a composite virtual reality environment. Virtual reality exercise regimens adapted to the user's individual capabilities, virtual reality exercise games, virtual reality competitive sports, and virtual reality team sports are disclosed.

U.S. Pat. No. 5,591,104

Inventor: Andrus

Issued: Jan. 7, 1997

A physical exercise video system includes a physical exercise machine, a video system and an interface module. The video system has a computer and a removable cartridge. The interface module is interposed between the computer and cartridge, and provides interactive communication between the computer and exercise machine. A communication protocol governs this communication, and includes specifications for status and command data packets. The video system and exercise machine can be selectively operated as either stand-alone units, or in an interactive exercise mode, wherein the exercise data generated by the exercise machine affects the output of the video system, and may also be stored in memory within the interface module. The video system controls the operation of the exercise machine generally, and specifically, controls the load resistance imposed in opposition to the movement of pedals. The control of load resistance by video system is a function of the operating characteristics of the exercise machine.

U.S. Pat. No. 5,913,727

Inventor: Ahdoot

Issued: Jun. 22, 1999

An interactive contact and simulation game apparatus in which a player and a three dimensional computer generated image interact in simulated physical contact. Alternately two players may interact through the apparatus of the invention. The game apparatus includes a computerized control means generating a simulated image or images of the players, and displaying the images on a large display means. A plurality of position sensing and impact generating means are secured to various locations on each of the player's bodies. The position sensing means relay information to the control means indicating the exact position of the player. This is accomplished by the display means generating a moving light signal, invisible to the player, but detected by the position sensing means and relayed to the control means. The control means then responds in real time to the player's position and movements by moving the image in a combat strategy. When simulated contact between the image and the player is determined by the control means, the impact generating means positioned at the point of contact is activated to apply pressure to the player, thus simulating contact. With two players, each player sees his opponent as a simulated image on his display device.

U.S. Pat. No. 6,102,832

Inventor: Tani

Issued: Aug. 15, 2000

A virtual reality simulation apparatus providing participants with simulations of horizontal walk and walk on slopes and steps with full reality in their feelings in their bodies. The apparatus comprises a walk surface mechanism including a pair of walk plates supporting a participant's feet, a foot bottom-position detecting device for detecting positions of feet-bottoms of the participant moved away from the walk plates, and a walk-plate horizontally-driving device, which horizontally shifts the walk plate, correspondingly to movements of the participant's feet, to cause the foot-bottom to be contacted on the walk plate and keep the participant's trunk in a fixed position. The apparatus has a miniature space and camera mechanism including a miniature space and a camera device which is movable in the miniature space to be placed in a direction imitating a view of the participant and take an image in the miniature space. A control device mixes a previously programmed image and an image taken by the miniature space and camera mechanism to transmit the composite image to an image display and show it to the participant, and controls the walk surface mechanism while causing the same to correspond to the images.

U.S. Pat. No. 6,336,891

Inventor: Fedrigon

Issued: Jan. 8, 2002

An interactive exercise pad system receives exercise data from a user stepping on and off of an exercise pad. The exercise data is optionally pre-processed in a data acquisition unit, before being communicated to a communications port of a computer. The computer obtains data files which have been pre-stored on media. The data files include video files, optional audio files and table files of location and terrain information. The video files and the table files are collected from a real exercise course. The computer processes the exercise data and the data files to playback the video files and the optional audio files so that the user experiences a realistic simulation of the real exercise course.

U.S. Pat. No. 6,468,086

Inventor: Brady-Koontz

Issued: Oct. 22, 2002

A method for the display of video images of exercises including the steps of partitioning the screen into at least two partitions; displaying information comprising text and numbers within one of the partitions; displaying an exercise movement within each of the other partitions wherein the exercise movement displayed in any one of the partitions is different from the exercises movements simultaneously displayed within any of the other partitions and preferably exercises a different muscle group than the other exercise movements so displayed. In one embodiment of the inventive method the exercise movements are displayed for a predetermined interval of time. The time remaining in the interval is displayed in the information partition. Upon expiration of the time interval, new exercise movements are displayed and a new interval time is set. This process repeats in a cyclic fashion for the duration of the video program. The inventive method allows the user to select exercise movements to achieve the results desired by the user and allows the user to vary the workout from day-to-day to reduce boredom and increase motivation.

U.S. Pat. No. 7,074,162

Inventor: Kuo

Issued: Jul. 11, 2006

An exercise device. The exercise device includes a wheel type treadmill, a roller shaft, a sensor, a panel, a processing unit, and a display. The wheel type treadmill has a plurality of footplates disposed on a wheel. The roller shaft is coupled to the wheel. The sensor is disposed on the treadmill, connecting with the roller shaft. The panel is coupled to the treadmill for setting operation modes. The processing unit is disposed in the panel to receive signals from the sensor and control the operation modes. The display is coupled to the panel, receiving video information from the processing unit and displaying environmental simulation. The device provides a more varied exercise experience.

Japanese Patent Application Number JP2007/097927

Inventor: Tsutoshi

Issued: Apr. 19, 1997

PROBLEM TO BE SOLVED: To provide a basic exercise training support apparatus allowing effective practice of related exercises and allowing school children to stepwisely practice basic exercise items using gymnastic appliances by comparing the moving pictures and captured images of the related exercises executed by performers with those of related exercises practiced by school children on reproduction windows on a monitor screen. SOLUTION: This basic exercise training support apparatus A is provided with hard disk 1 storing video signals 60 sent by a video camera 6 capturing the school children 61 practicing the exercise using the gymnastic appliances as practice moving pictures, DVD media 21 recorded with model moving pictures capturing exercise executed by the performers, and moving picture reproduction software 3 decoding data of the model moving pictures red from the DVD media 21 and the practice moving pictures stored in the hard disk 1 and simultaneously displaying them on model moving picture and practice moving picture reproduction windows on a liquid crystal display 5. This constitution allows the school children 61 to stepwisely learn the basic exercise items.

Japanese Patent Number JP6165847

Inventor: Katsumi

Issued: Jun. 19, 1994

PURPOSE: To provide a physical exercise training device by which a trainer can execute the training of physical exercise such as golf while observing his own training posture. CONSTITUTION: The gold training device consists of a video camera 1 for photographing a trainer 6, a video information selecting device 2 having a changeover switch for selecting at least one of first video information photographed by the video camera concerned 1 and second video information of an ideal form of a professional golfer, etc., stored in a video storage part, and a spectacles type display device 9 attached to the head part of the trainer 6 so that the left and the right respective video display part are positioned in front of the left and the right respective eyes of the trainer 6. Also, the video display device 9 inputs the video information selected by the video information selecting device 2 and projects it to the video display parts, and also, has a clearance 16 through which the trainer 6 can peep at a golf ball 19 from a lower part.

Japanese Patent Number JP10263126

Inventor: Norio

Issued: Oct. 6, 1998

PROBLEM TO BE SOLVED: To enable to find or correct a defect in his/her form of exercise even if a coach person has no sufficient skillfulness, by displaying both an object for analysis and a model form and comparing both to point out differences between the object and the model form. SOLUTION: The ideal form is inputted into a personal computer before completion of this system. An exercise is photographed by a video camera 1 and the images are inputted into the personal computer 2. The images are recorded in a fixed disc as a motion picture and what is assumed as the object of the analysis is discriminated form the images. Stationary images at time intervals prescribed by sports executed by an object of the analysis are taken out. As the result, variation of the object of the analysis can be stepwisely grasped. An ideal form and the object of the analysis are displayed on a display and a defect of the object made clear by comparing with the ideal form is pointed out to suggest a correction method of the form.

International Patent Application Number WO97/05926

Inventor: Jarvik

Issued: Feb. 20, 1997

This invention relates to computer (13) controlled exercise machines, and provides the user (2) with a wide variety of interactive exercise options controlled by the software. A "virtual reality" environment or a hybrid of virtual and real environment is provided which permits the user to perform significant physical exertion by applying forces to the machine while viewing images on a head mounted display (12, 150). The invention includes means for the user to view his own hands and body superimposed over a computer generated image of objects that are not actually present while maintaining parts of the exercise machine that the user physically contacts, such as a handle (18, 60, 96), superimposed over the computer generated image. As the user exerts forces against the machine (such as handle) he perceives that he is exerting forces against the objects the images represent. The invention includes video camera (148) and computer means, adapted to record images from the real world, which may be combined with computer generated images while retaining proper spatial orientation to produce a composite "virtual reality" environment.

While these virtual physical fitness, exercise and gaming systems may be suitable for the purposes for which they were designed, they would not be as suitable for the purposes of the present invention, as hereinafter described.

SUMMARY OF THE PRESENT INVENTION

A primary object of the present invention is to provide a video editing system that allows the user to overlay or embed live video into existing video to create a combined video.

Another object of the present invention is to provide a video editing system that creates a combined video utilized for improving physical fitness.

Yet another object of the present invention is to provide a video editing system that creates a combined video utilized for teaching dance choreography.

Still yet another object of the present invention is to provide a video editing system that creates a combined video utilized for teaching proper technique for sporting or other activities.

Another object of the present invention is to provide a video editing system that creates a combined video utilized for entertainment purposes.

Yet another object of the present invention is to provide a video editing system that allows the user to define the size of area for the overlay to suit individual prerecorded videos.

Still yet another object of the present invention is to provide a video editing system that allows the user to define the location of area for the overlay to suit individual prerecorded videos.

Another object of the present invention is to provide a video editing system comprising an overlay having image and a background.

Yet another object of the present invention is to provide a video editing system having processor executable software providing means for separating the overlay image from the overlay background.

Still yet another object of the present invention is to provide a video editing system having processor executable software providing means for projecting the overlay image onto an existing video image thereby incorporating the overlay image with the existing video image.

Additional objects of the present invention will appear as the description proceeds.

The present invention overcomes the shortcomings of the prior art by providing processor executable software that takes the video image and splits it into two elements comprising an image 28 and a background 66 with the overlay field 34 positioned within video image background, as shown in FIG. 3B. When the software of the present invention generates overlay field 34, as shown in FIG. 3C, the overlay field 34, positioned within video background 66, is comprised of image 62 and background 64. The processor executable software provides for separation of overlay field 34 image 62 from overlay field background 64 so that the original video image background 66 is overlaid only by the overlay image 62, as shown in FIG. 3D. FIG. 3E exemplifies the overlay process where the processor executable software takes overlay image 62 and superimposes image 62 upon the video image. The advantage of the present invention provides that the processor executable software allows the user to superimpose their image into an existing media image so that on display 18 it would appear that overlay image 62 is part of the original provided video image The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
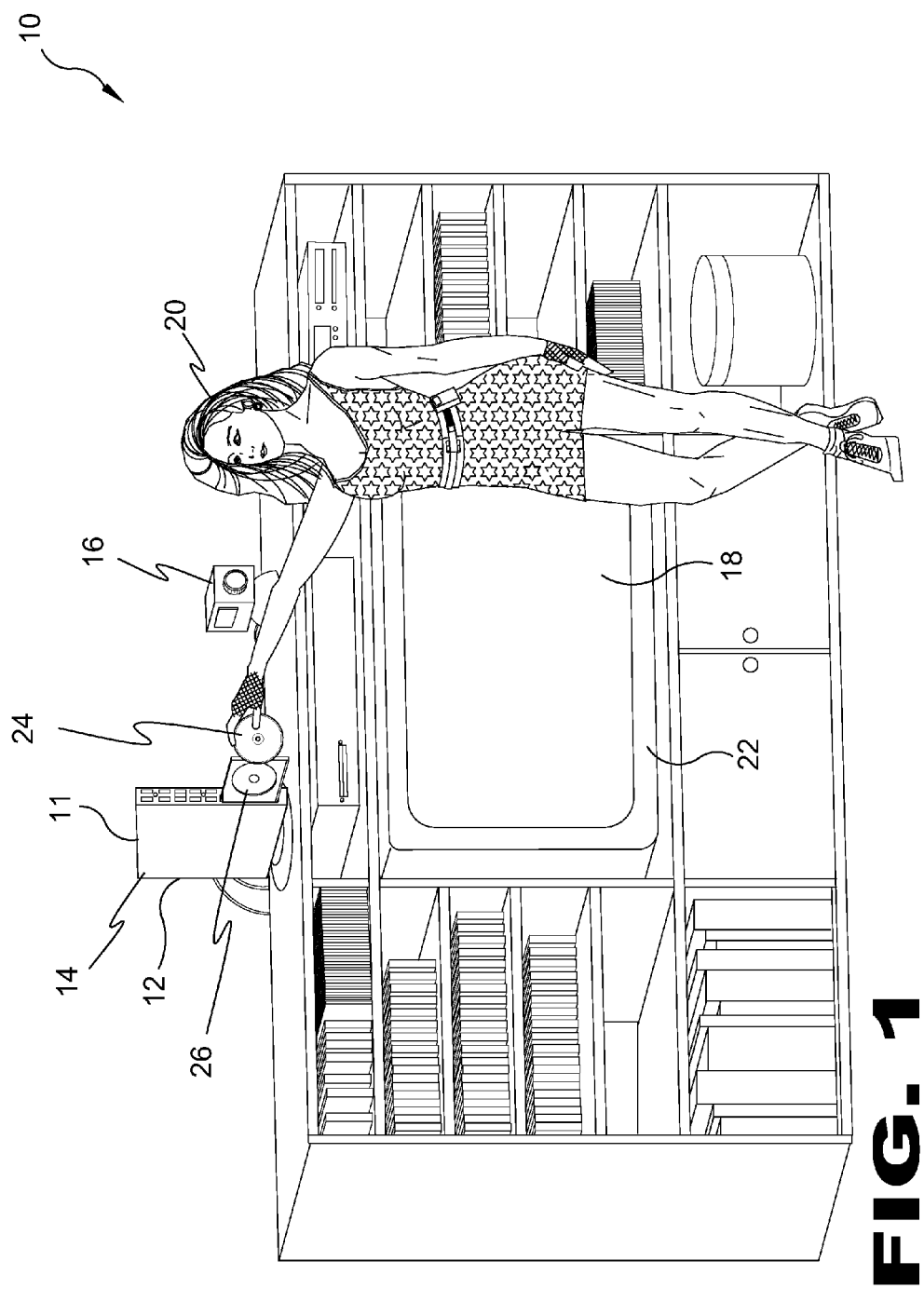
FIG. 1 is an illustrative view of the present invention in use.

Turning now descriptively to the drawings, in which similar reference characters denote similar elements throughout the several views, the figures illustrate the Picture-in-Picture Overlay Video System for Superimposing a Real Time Video Image onto a Prerecorded Video Image of the present invention. With regard to the reference numerals used, the following numbering is used throughout the various drawing figures.

Picture-in-Picture Overlay Video System for Superimposing a Real Time Video Image onto a Prerecorded Video Image of the present invention.
11 media playback/recording device
12 gaming device
14 Playstation 2
16 digital video camera 18 viewing screen
20 user
22 television
24 prerecorded disc
26 disc holder
28 prerecorded video presentation
30 exercise instructor
32 hand held analog controller
34 video field
36 video field size adjustment
38 video field position adjustment
40 user's video compilation
41 video frame editing software
42 set-up module
44 recording module
46 evaluation module
48 USB cable
50 wireless connection
52 DVD player
54 laptop computer
56 desktop computer
58 exercise instruction video
60 sports instruction video
62 video field image
64 video field background
66 prerecorded video image background

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments; practitioners skilled in the art will recognize numerous other embodiments as well. For definition of the complete scope of the invention, the reader is directed to appended claims.

Referring to FIG. 1, shown is an illustrative view of the present invention 10 in use. The present invention 10 is a method and apparatus for virtual exercise, instructional dance and sports having a pre-recorded DVD, video, or CD of instruction in communication with a media playback/recording device 11 such as a gaming device 12 such as play station 2 14, DVD player, lap top or desk top computer. A digital video camera 16 records the user's 20 image and projects that image onto the viewing screen 18 (depicted here as a television 22) next to the prerecorded image provided by a pre-recorded disc 24 of the instructor allowing the user 20 to exercise/practice with the instructor's guidance. Shown is the user 20 placing a pre-recorded disc 24 into the disc holder 26.

Figure 2:
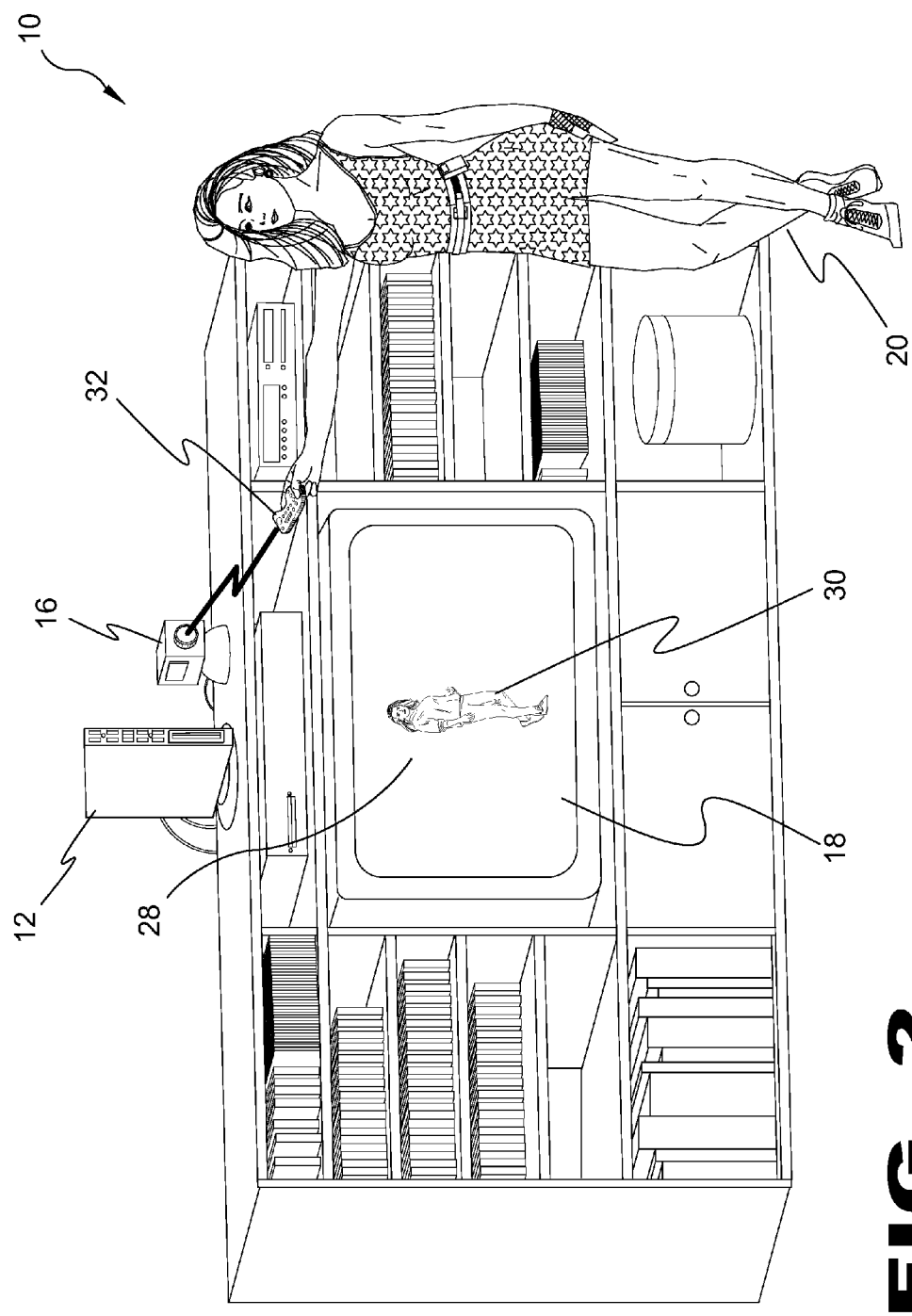
FIG. 2 is an illustrative view of the present invention in use.

Referring to FIG. 2, shown is an illustrative view of the present invention 10 in use. Shown is the user 20 having initiated play of the disc in the gaming device 12 of a video presentation 28 of an exercise instructor 30 displayed on the viewing screen 18. The user 20 manipulates the function of the camera 16 with an analog controller 32.

Figure 3A:
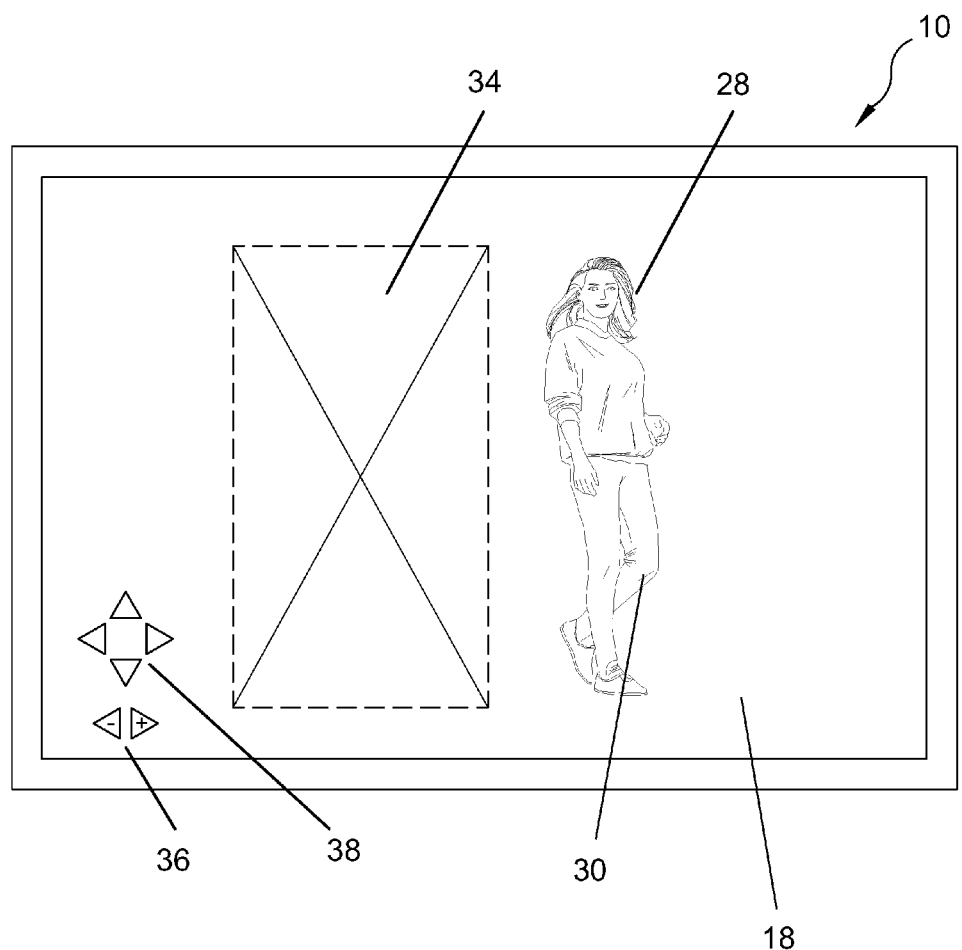
FIG. 3A-3E is an illustrative view of the present invention in use.
Figure 3B:
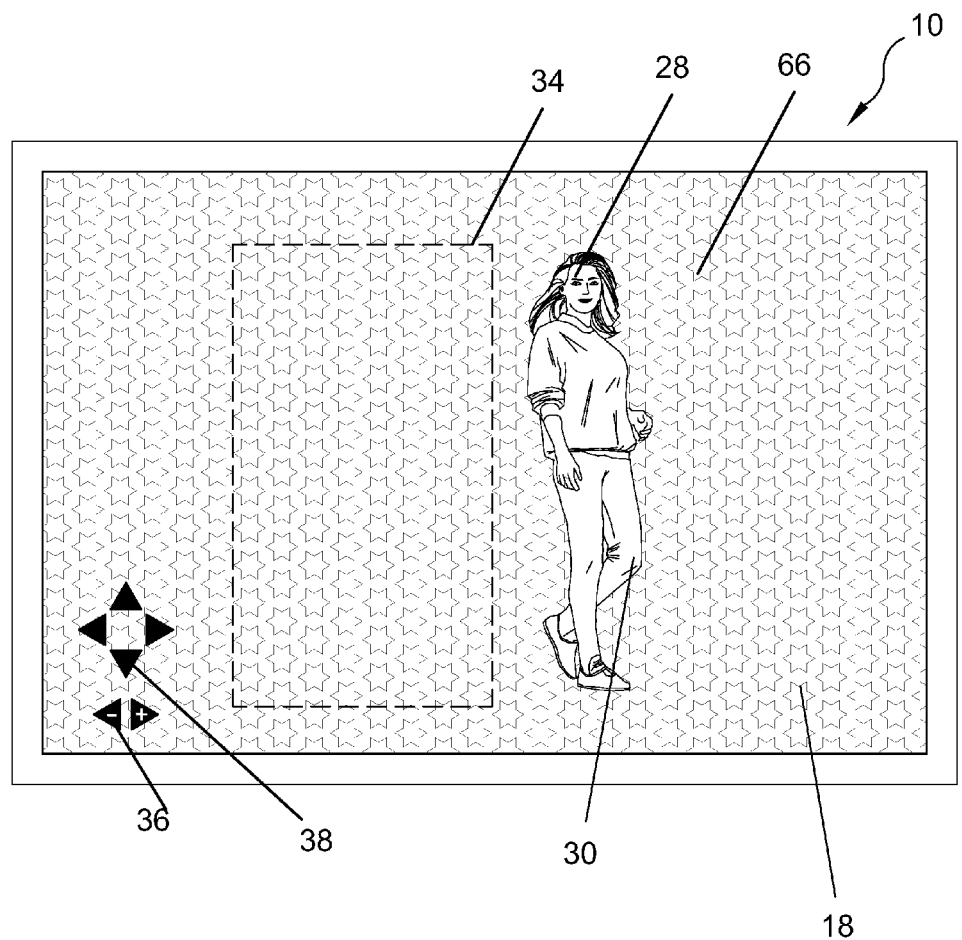
Figure 3C:
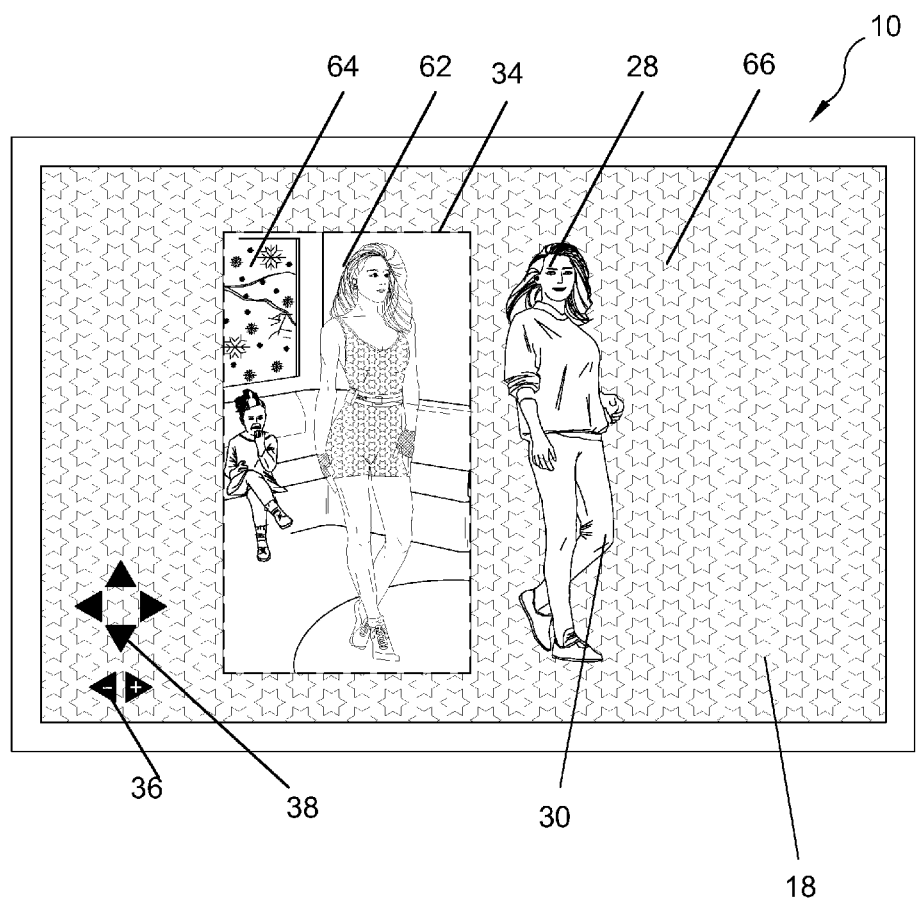
Figure 3D:
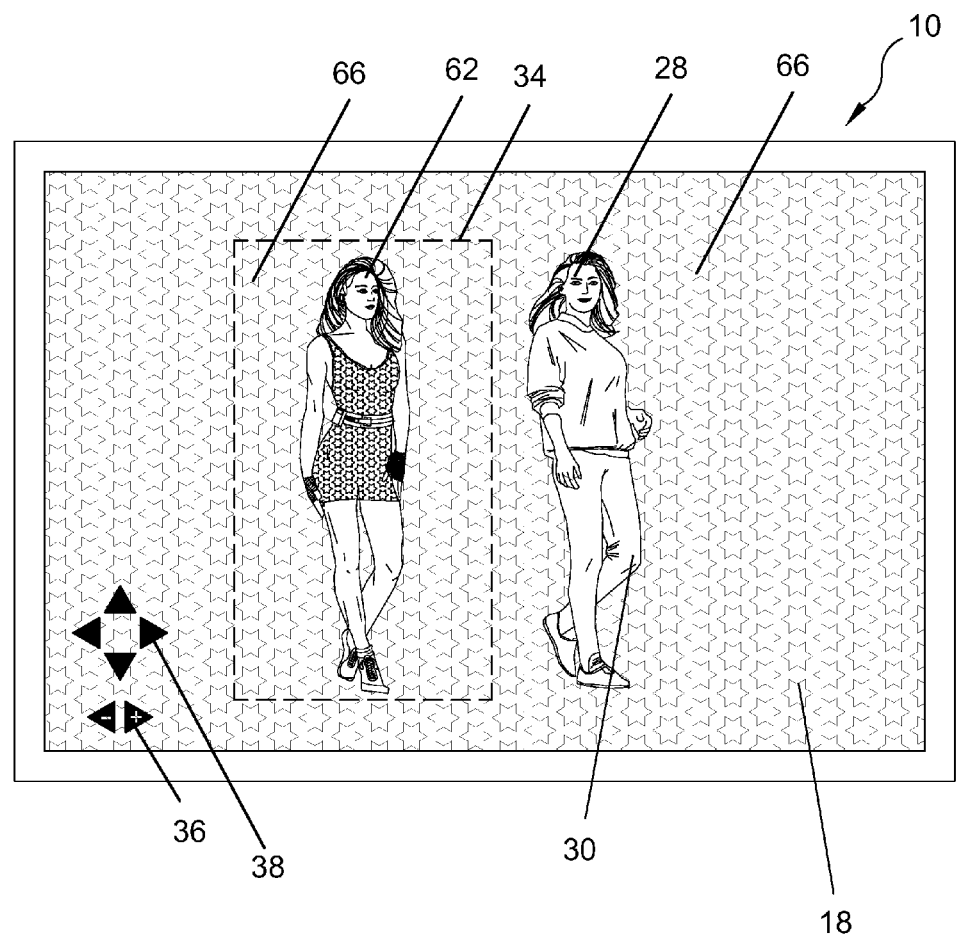
Figure 3E:
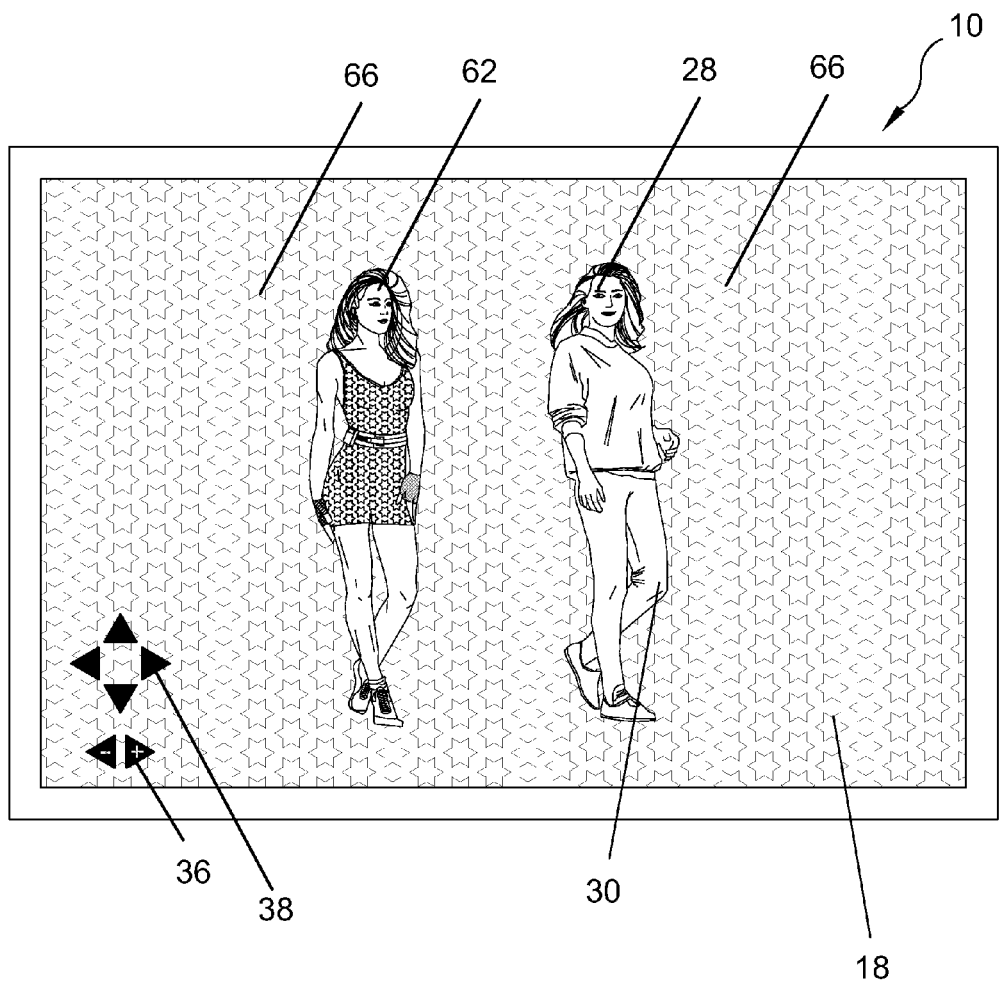

Referring to FIG. 3A through 3E, shown is an illustrative view of the present invention in use. Illustrated in FIG. 3A is a video presentation 28, of exercise instructor 30, and the user designated video compilation comprising video field 34. The present invention provides processor executable software that takes the video presentation and splits it into two elements comprising an image 28 having background 66 with the user designated video compilation video field 34 positioned within video image background 66, as shown in FIG. 3B. When the software of the present invention receives the user designated video compilation comprising video field 34, as shown in FIG. 3C, the video field 34, positioned within video background 66, is comprised of video field image 62 and video field background 64. The processor executable software provides for separation of the user designated video compilation 40 video field image 62 from video field background 64 so that the original video image background 66 is inlaid only by the user designated video compilation image 62, as shown in FIG. 3D. FIG. 3E exemplies the inlay process where the processor executable software takes video field image 62 and integrates image 62 into the video image. The advantage of the present invention provides that the processor executable software allows the user to integrate their image into an existing video presentation so that on display 18 it would appear that video field image 62 is part of the original provided video presentation 28. Further provided by the processor executable software is the ability to record the derivative work for later playback.

Additionally, the method and apparatus for a picture-in-picture inlay of user designated real time video compilation into a prerecorded video image 28 can be utilized to make video field size adjustment 36 and video field position adjustments 38 of the video field 34 that projects the user's designated video field compilation onto the viewing screen 18 next to the instructor 30 allowing the user to exercise/practice along side of the instructor's 30 guidance.

Figure 4:
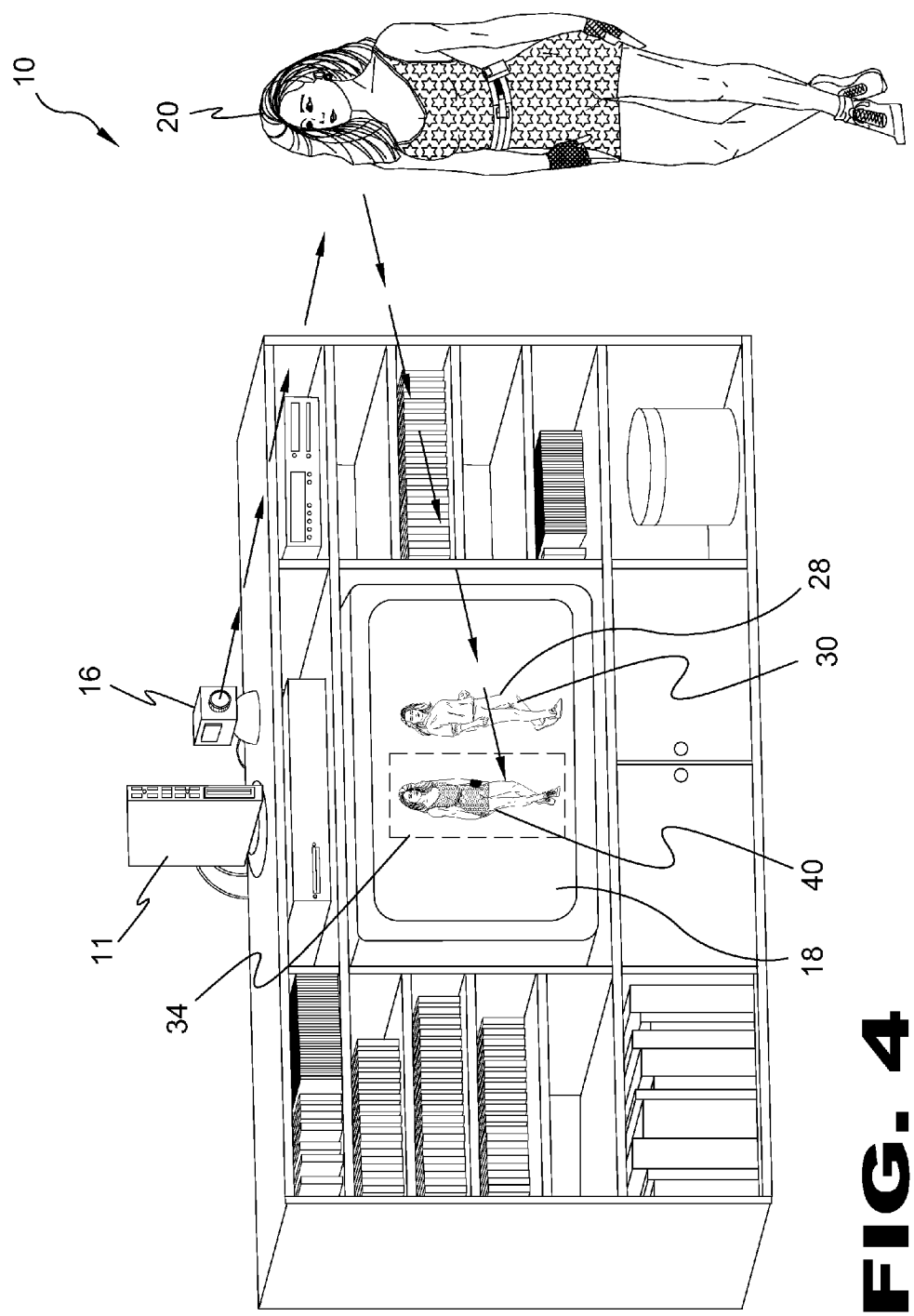
FIG. 4 is an illustrative view of the present invention in use.

Referring to FIG. 4, shown is an illustrative view of the present invention 10 in use. The pre-recorded DVD, video, or CD of a video presentation 28, which may be an instructional video, entertainment video, music video or performing arts video is played on viewing screen 18. Whereupon a USB camera 16 is activated to record the user's designated video compilation 40 and send it to the media playback/recording device 11 to inlay video compilation 40 comprising video field 34 into video presentation 28 using video frame editing software then viewing the derivative work on screen 18 thereby providing the user with means to incorporate their video compilation 40 into video presentation 28 whether the original video presentation is an exercise video featuring instructor 30 or a rock concert of a favorite band allowing the user 20 to integrate their image 34 into the original video presentation and record the derivative work for later playback.

Figure 5:
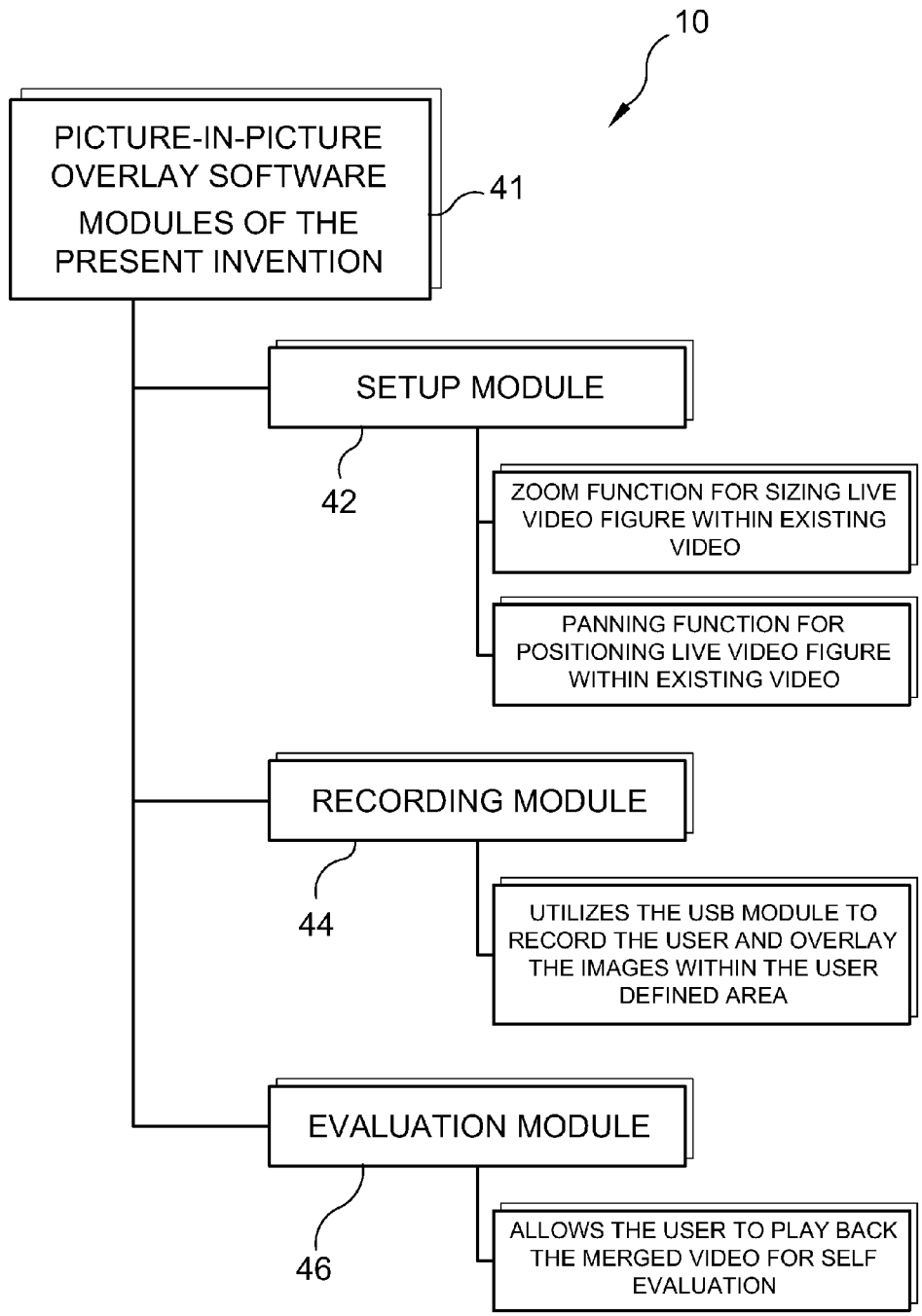
FIG. 5 is a block diagram of different modules of the present invention's video methods the present invention provides means for overlaying video within a prerecorded DVD, video, or CD.

Referring to FIG. 5, shown is a block diagram of picture-in picture software modules 41 of the present invention 10. The setup module 42 allows the user to define the size and position of the video overlay. The recording module 44 provides means to project the user's live feed onto the area of overlay. The evaluation mode 46 allows the user to playback the combined video for self evaluation.

Figure 6:
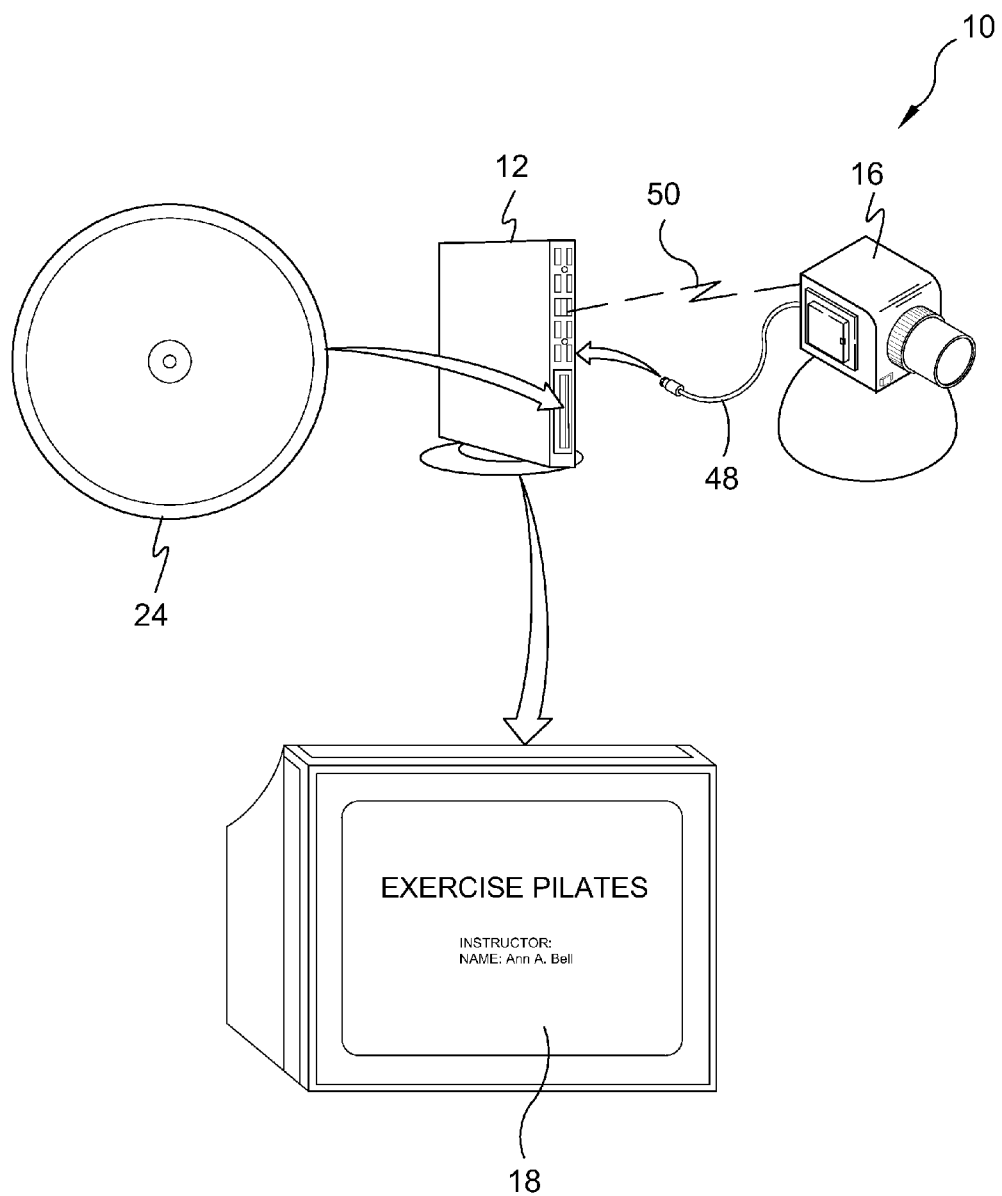
FIG. 6 is an illustrative view of the present invention in use with a play station 2 unit.

Referring to FIG. 6, shown is an illustrated view of the present invention 10 showing the camera 16 that delivers images to the gaming device 12 via a USB cable 48 or wireless connection 50. The image is the superimposed onto an image provided by the prerecorded disc 24 and displayed on the viewing screen 18.

Figure 7:
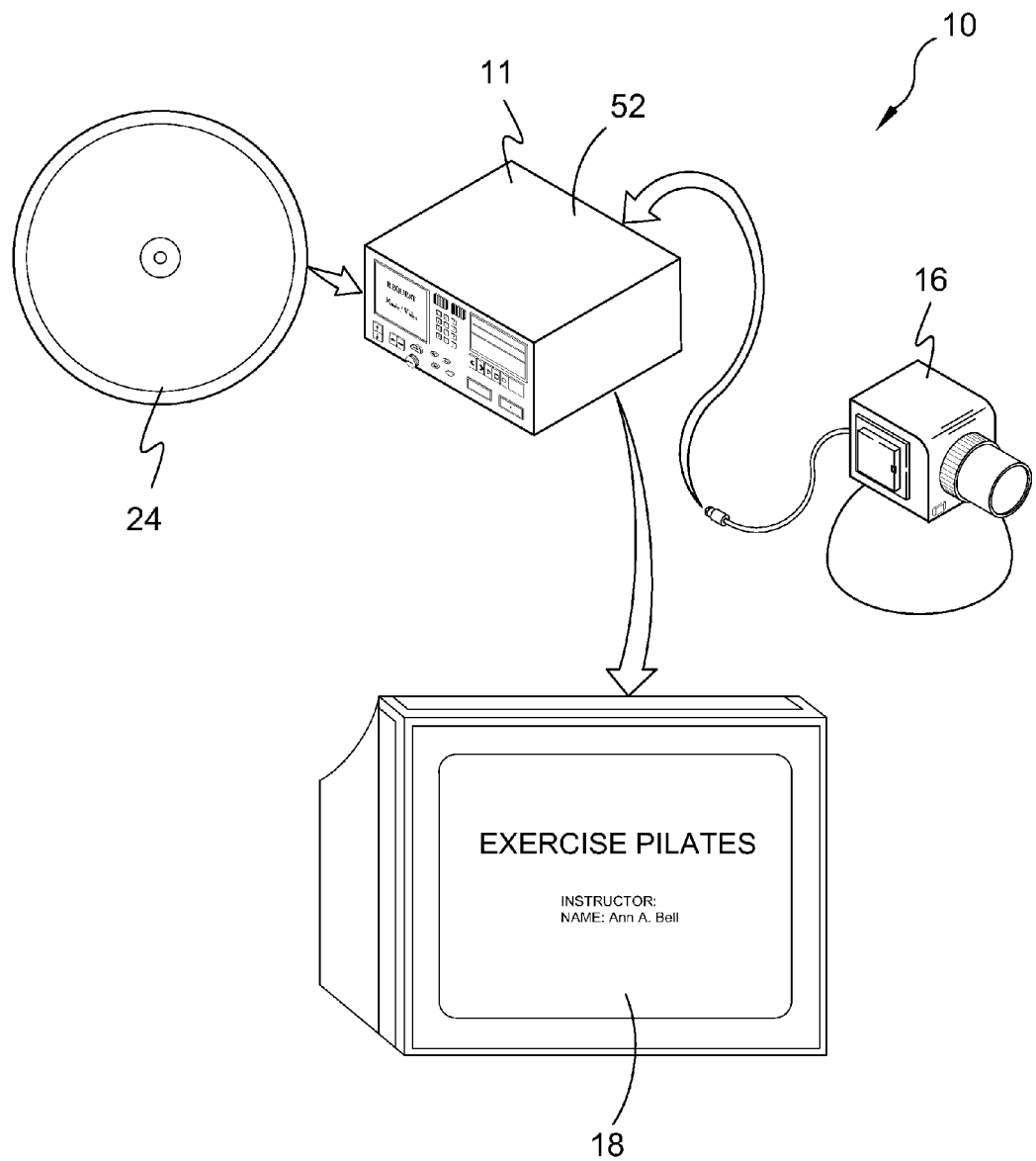
FIG. 7 is an illustrative view of the present invention in use with a DVD player.

Referring to FIG. 7, shown is an illustrative view of the present invention 10 showing the camera 16 that delivers images to the media player/recording device 11 depicted here as a DVD player 52. The image is the superimposed onto an image provided by the prerecorded disc 24 and displayed on the viewing screen 18.

Figure 8:
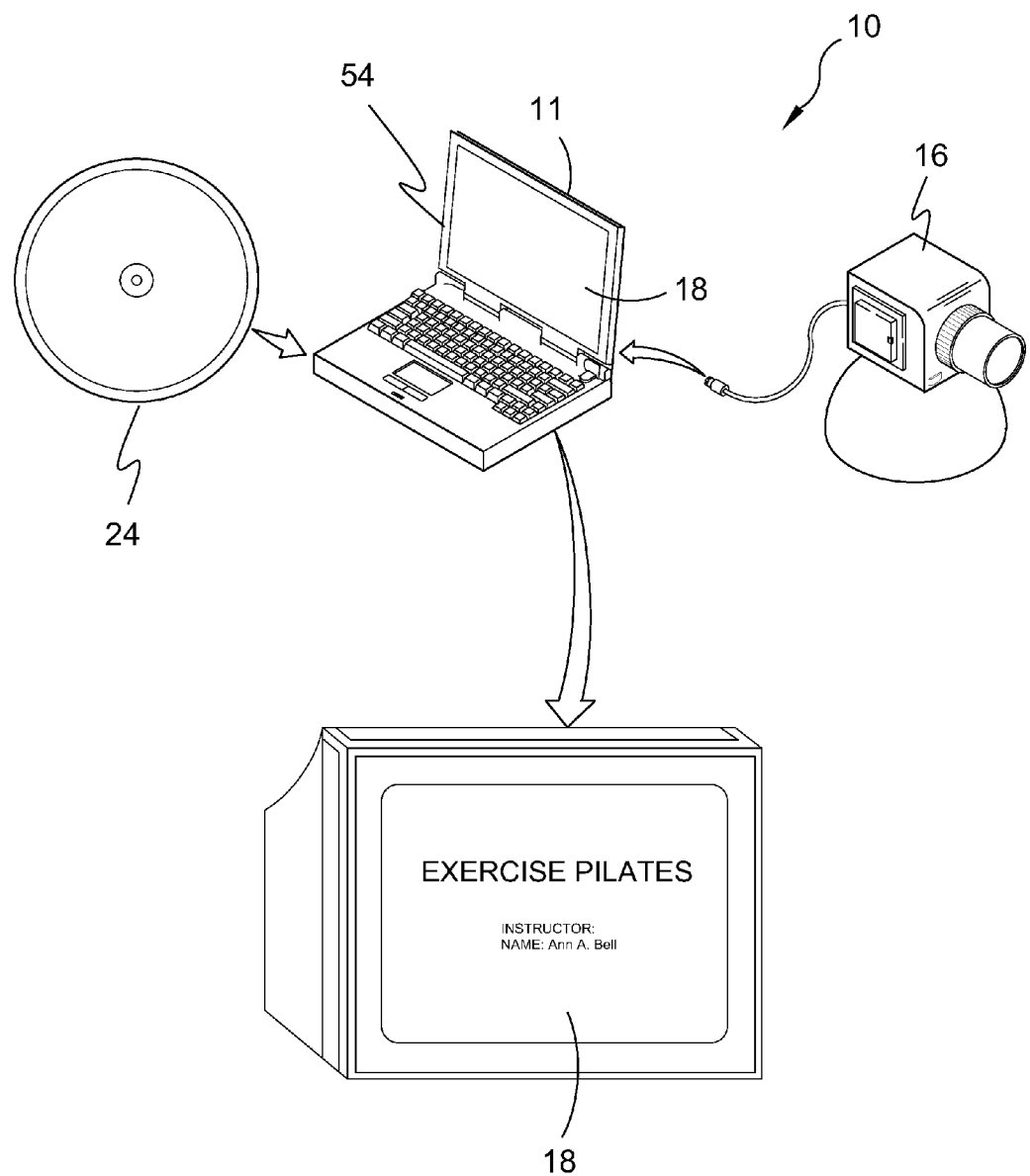
FIG. 8 is an illustrative view of the present invention in use with a lap top computer.

Referring to FIG. 8, shown is an illustrative view of the present invention 10 showing the camera 16 that delivers images to the media player/recording device 11 depicted here as a laptop computer 54. The image is the superimposed onto an image provided by the prerecorded disc 24 and displayed on the viewing screen 18.

Figure 9:
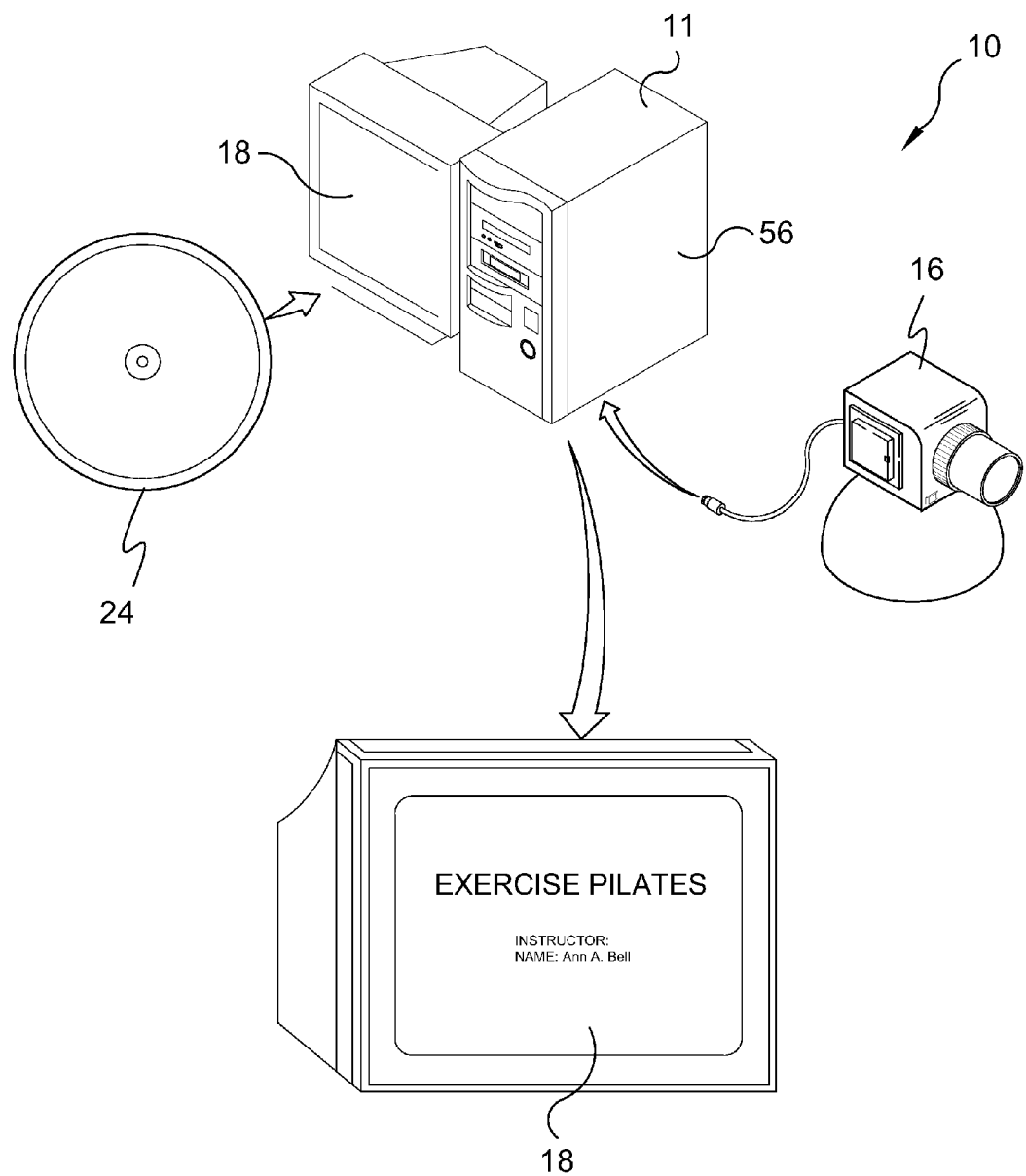
FIG. 9 is an illustrative view of the present invention in use with a desk top computer.

Referring to FIG. 9, shown is an illustrative view of the present invention 10 showing the camera 16 that delivers images to the media player/recording device 11 depicted here as a desktop computer 56. The image is the superimposed onto an image provided by the prerecorded disc 24 and displayed on the viewing screen 18.

Figure 10:
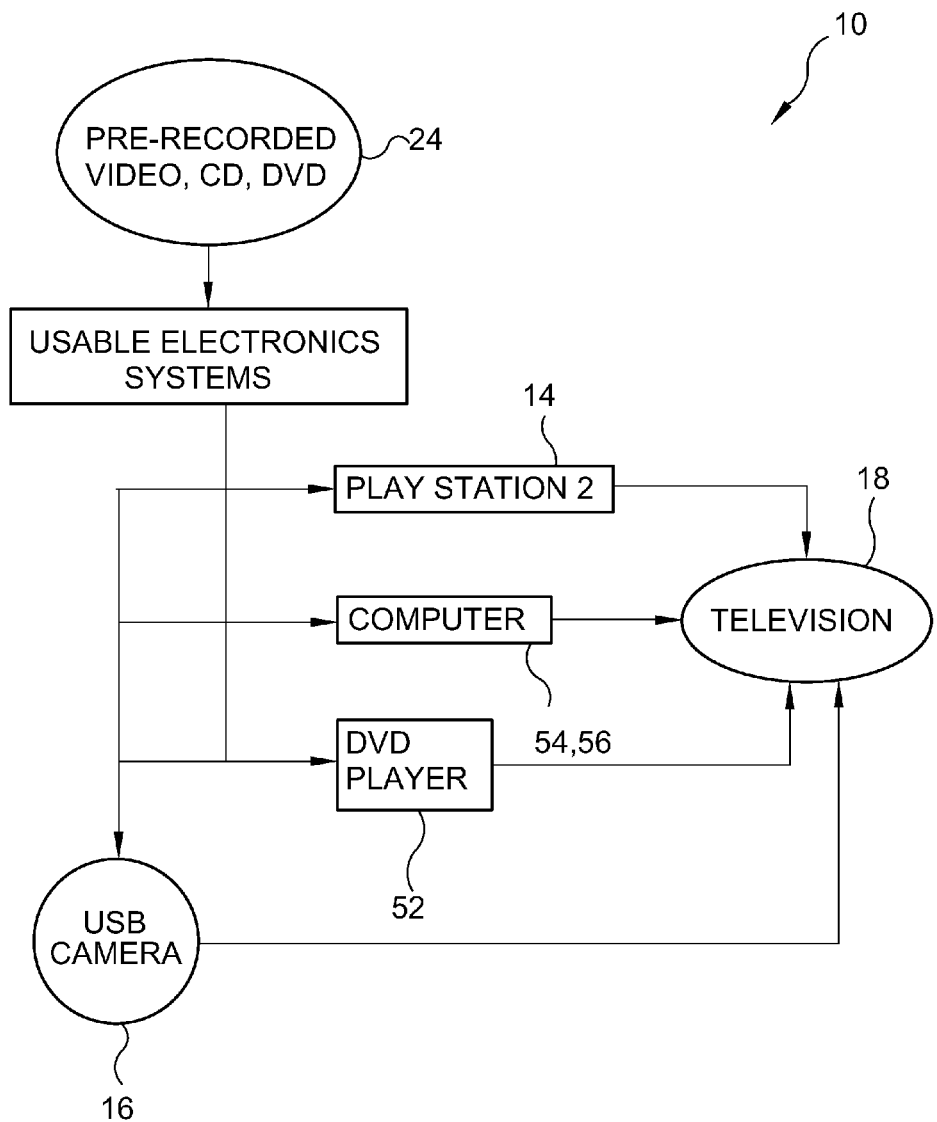
FIG. 10 is a chart of usable components of the present invention.

Referring to FIG. 10, shown is a chart of usable components of the present invention 10. The present invention is a method and apparatus for virtual exercise, instructional dance and sports having a pre-recorded disc 24 of instruction in communication with a play station 2 14, DVD player 52, lap top 54 or desk top 56 computer. A USB camera 16 records the user's image and projects that image onto the viewing screen 18 next to the instructor allowing the user to exercise/practice with the instructor's guidance.

Figure 11:
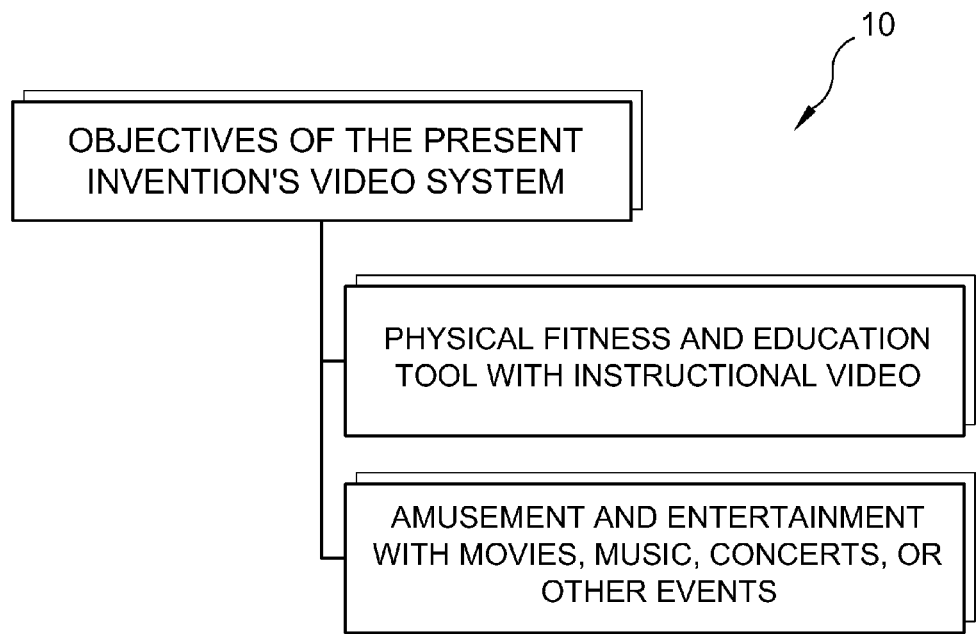
FIG. 11 is a block diagram of video system of the present invention

Referring to FIG. 11, shown is a block diagram of video system of the present invention 10. The video system of the present invention 10 can be utilized for fitness, education, and entertainment purposes. The video system provides improved means for instructional exercise through interactive lessons that are displayed for review and analysis. Additionally, the video system may be utilized as an entertainment system whereas, the user can overlay them selves and portrayed in a movie, concert or other video.

Figure 12:
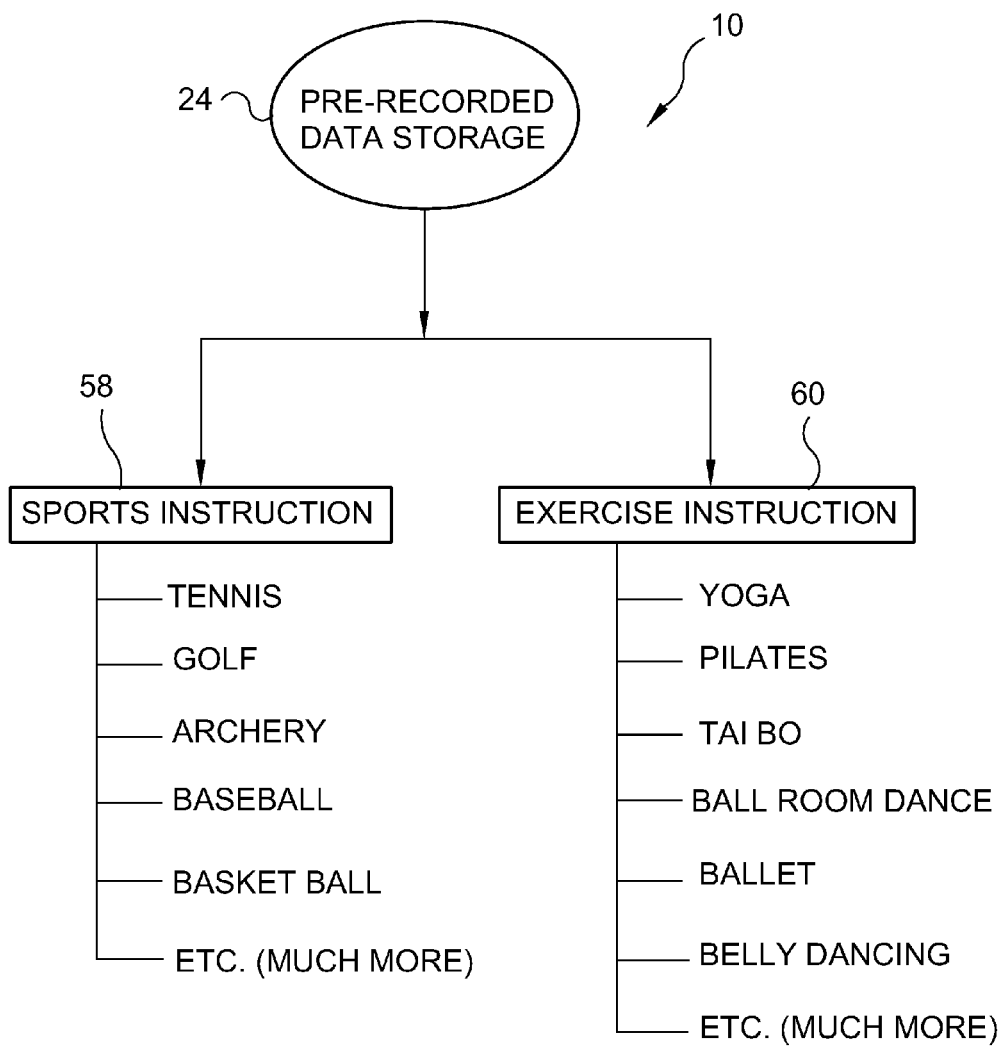
FIG. 12 is a chart of instructional software of the present invention.

Referring to FIG. 12, shown is a chart of instructional software of the present invention 10. The instructional dance and sports pre-recorded disc 24 provides a plurality of instructional software allowing the user to pre select their lesson including exercise instruction 58 and sports instruction 60.

Figure 13:
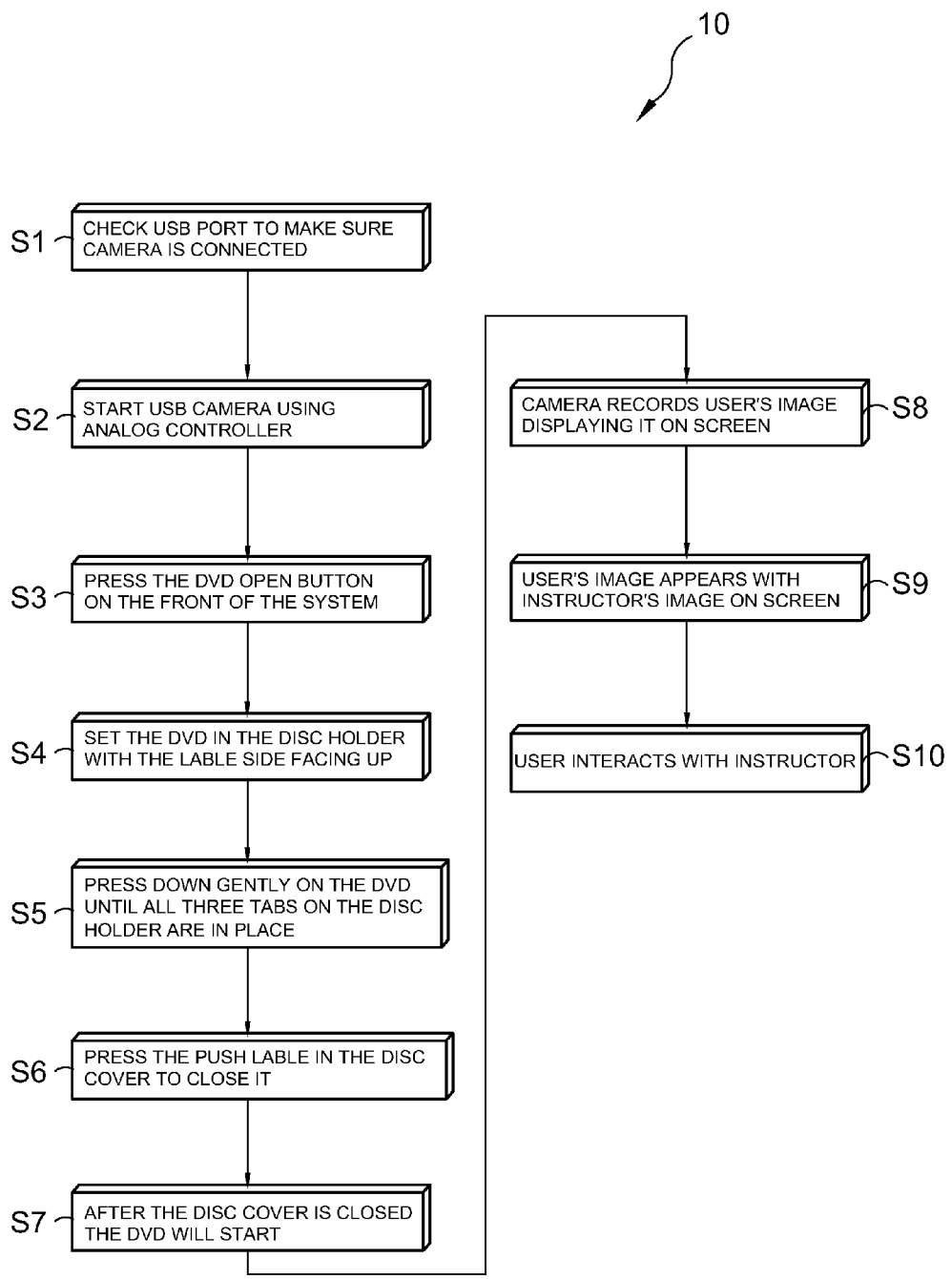
FIG. 13 is a flow chart of the present invention "to start".

Referring to FIG. 13, shown is a flow chart of the present invention 10 "to start". Shown is a chart of the present invention 10, a method and apparatus for virtual exercise, instructional dance and sports having a pre-recorded DVD, video, or CD with start up directions.

Figure 14:
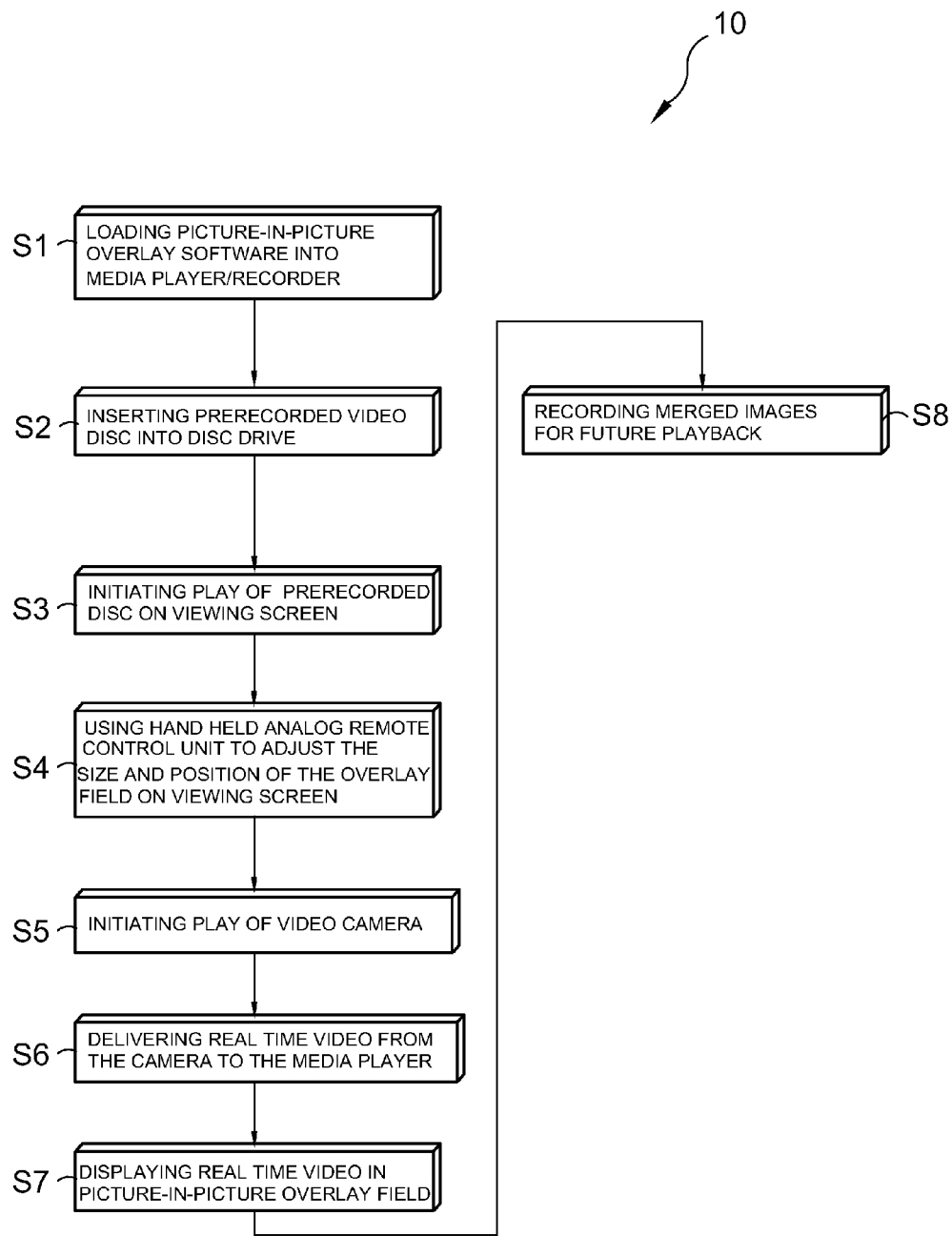
FIG. 14 is a flow chart demonstrating the method of operation of the present invention.

Referring to FIG. 14, shown is a flow chart demonstrating the method of operation of the present invention 10.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A video editing system for inserting a real time user designated field image into a prerecorded video and simultaneously displaying a combined single stream video output on a viewing screen comprising:
   a) a media player/recording device;
   b) video frame editing software installed in said media player whereby a user designated video field compilation comprises a field image and a field background;
   c) a digital video camera in communication with said media player;
   d) a prerecorded video;
   e) a hand held control unit; and
   f) a viewing screen display;
   wherein said video frame editing software of said media player is configured for receiving a user designated field image incorporating said field image into a prerecorded video, thereby creating said combined single stream video output such that said field image of said video field compilation is part of said prerecorded video, and wherein said field image is a live video feed recorded by said digital video camera;
   said combined video output being displayed on said viewing screen display simultaneously with the step of incorporating said field image into said prerecorded video;
   wherein said user directs said digital video camera to record said user to create an editable, real time video, said user defining said field image positionable within said prerecorded video allowing live, video-based user comparison with an action of an instructor of said prerecorded video and said video frame editing software removing said field background based on the simultaneous incorporating of said field image into said prerecorded video and display of said combined single stream video output in real time; and
   wherein said comparison with the action of said instructor is performed by positioning said field image next to the image of the instructor provided by said prerecorded video and adjusting a position and a sizing of said field image accordingly, forming said combined single stream video real time display.

2. The video editing system recited in claim 1, wherein the processor executable software comprising said overlay field image and said overlay field background provides for independently displaying said image from said background.

3. The video editing system recited in claim 1, wherein said viewing screen is a television.

4. The video editing system recited in claim 1, wherein said viewing screen is a computer monitor.

5. The video editing system recited in claim 1, wherein said digital video camera communicates with said media player/recording device via a USB cable.

6. The video editing system recited in claim 1, wherein said digital video camera communicates with said media player/recording device via a wireless connection.

7. The video editing system recited in claim 1, wherein said media player/recording device is selected from the group consisting of:
   a) a gaming device;
   b) a computer; and
   c) a DVD player.

8. The video editing system recited in claim 7, wherein said gaming device is a Sony Playstation 2.

9. The video editing system recited in claim 7, wherein said computer is a desktop computer.

10. The video editing system recited in claim 7, wherein said computer is a notebook computer.

11. The video editing system recited in claim 1, wherein said video frame editing software receiving a user designated video field incorporates said video field into a predetermined plurality of video frames of the prerecorded video presentation contained on said prerecorded video.

12. The video editing system recited in claim 11, wherein said video frame editing software comprises:
   a) a set-up module enabling the user to manipulate the size; position of said field image; and
   capture a field background to be removed;

b) a recording module for saving the user designated combined single stream video output of said field image and said prerecorded video; and c) an evaluation module to enable playback of saved combined single stream video output of said field image and prerecorded video.

13. The video editing system recited in claim 12, wherein said prerecorded video is selected from the group of instructional videos, entertainment videos, music videos and performing arts videos.

* * * * *